US012752193B2

(12) United States Patent
Azmandian et al.

(10) Patent No.: US 12,752,193 B2
(45) Date of Patent: Oct. 6, 2026

(54) AI PLAYER MODEL GAMEPLAY TRAINING AND HIGHLIGHT REVIEW

(71) Applicant: Sony Interactive Entertainment Inc., Tokyo (JP)

(72) Inventors: Mahdi Azmandian, San Mateo, CA (US); Kazuyuki Arimatsu, San Mateo, CA (US); Lakshmish Kaushik, San Mateo, CA (US)

(73) Assignee: Sony Interactive Entertainment Inc., Tokyo (JP)

(*) Notice: Subject to any disclaimer, the term of this patent is extended or adjusted under 35 U.S.C. 154(b) by 699 days.

(21) Appl. No.: 17/948,047

(22) Filed: Sep. 19, 2022

(65) Prior Publication Data

US 2024/0100440 A1 Mar. 28, 2024

(51) Int. Cl.

| | |
|---|---|
| ***A63F 13/67*** | (2014.01) |
| ***A63F 13/355*** | (2014.01) |
| ***A63F 13/493*** | (2014.01) |
| ***A63F 13/497*** | (2014.01) |
| ***A63F 13/798*** | (2014.01) |
| ***G06N 20/00*** | (2019.01) |

(52) U.S. Cl.

CPC ............ *A63F 13/67* (2014.09); *A63F 13/355* (2014.09); *A63F 13/493* (2014.09); *A63F 13/497* (2014.09); *A63F 13/798* (2014.09); *G06N 20/00* (2019.01)

(58) Field of Classification Search

CPC ...... A63F 13/67; A63F 13/355; A63F 13/493; A63F 13/497; A63F 13/798; G06N 20/00

USPC ........................................................... 463/23

See application file for complete search history.

(56) References Cited

U.S. PATENT DOCUMENTS

| | | | | |
|---|---|---|---|---|
| 10,576,380 | B1 * | 3/2020 | Beltran | A63F 13/67 |
| 2020/0197815 | A1 * | 6/2020 | Beltran | A63F 13/44 |
| 2020/0197821 | A1 | 6/2020 | Benedetto | |
| 2020/0289943 | A1 | 9/2020 | Rico et al. | |
| 2020/0306638 | A1 | 10/2020 | Fear et al. | |
| 2021/0106918 | A1 | 4/2021 | Osman et al. | |
| 2023/0051449 | A1 * | 2/2023 | Froy | G07F 17/3237 |

OTHER PUBLICATIONS

Intl Search Report and Written Opinion, PCT/US2023/074451, dated Jan. 19, 2024, 13 pages.

* cited by examiner

*Primary Examiner* — Ryan Hsu

(74) *Attorney, Agent, or Firm* — Kilpatrick Townsend & Stockton LLP

(57) ABSTRACT

Methods and systems for engaging an AI player of a user to play a video game on behalf of the user includes creating the AI player for the user using at least some of the attributes of the user, training the AI player using inputs provided by the user during game play of the video game, and providing access to the video game for game play to the AI player. The access allows the AI player to provide inputs to the video game that substantially mimics a play style of the user. Control of the game play of the video game can be transitioned to the user at any time during the game play of the AI player. The user can also control the game play of the AI player from a video recording of the game play.

21 Claims, 7 Drawing Sheets

AI PLAYER MODEL GAMEPLAY TRAINING AND HIGHLIGHT REVIEW

FIELD

The present disclosure relates to systems and methods for generating and training an artificial intelligence (AI) player to play a video game on behalf of a user.

BACKGROUND

With the growing popularity of online media, users are able to enjoy viewing and interacting with content of the online media from anywhere. The online media content includes content provided by content providers for user consumption and content generated by users. The content generated by users can include game play data resulting from the users playing video games. A user can play a video game individually or with other users. As more and more video games are being hosted by a cloud service, the user is able to access and play the video game from anywhere. When the video game is a multi-player video game, the user is able to team with other users to play the video game. However, with the number of video games available to the users growing over time, it is quite challenging for the user to spend time to explore and sample different video games. Further, as the user can have multiple commitments during the day, the user has limited time each day to sample and/or experience game play of the different video games.

It is in this context that embodiments of the invention arise.

SUMMARY

Implementations of the present disclosure relate to systems and methods for generating and training an artificial intelligence (AI) player for a user and provide access to one or more video games that the user plays to allow the AI player to play the one or more video games on behalf of the user.

In one implementation, a method for engaging an Artificial Intelligence (AI) player is disclosed. The method includes creating the AI player to represent a user. The AI player is created to adapt a portion of attributes of the user maintained in a user profile of the user. The created AI player is associated with the user. Game play data of the user captured during game play of a video game is retrieved and analyzed to identify a play style exhibited by the user during the game play of the video game. The game play data includes details of inputs provided by the user and game states of the video game generated from the inputs of the user. The AI player associated with the user is trained to substantially mimic the play style of the user determined from the inputs provided by the user during game play. The trained AI player is provided access to the video game for game play. The access allows the AI player to provide inputs in accordance to the play style adapted from user so as to progress in the video game. The inputs from the AI player are used to generate game play data for the video game.

In another implementation, a method for engaging an artificial intelligence player is disclosed. The method includes receiving, at a server computing device, inputs for a video game. The inputs are used to generate streams of game play data of the video game for rendering on a client device of a user. The game play data is analyzed to determine that the inputs are provided by an artificial intelligence (AI) player associated with the user. The AI player is created and trained in accordance to a play style of the user such that the inputs of the AI player substantially mimic the play style of the user. A request is received from the user to control the game play of the video game of the AI player. The request identifies a transfer point in the video game from which the user intends to resume game play of the video game. In response to the request, control of the game play of the video game is dynamically transferred from the AI player to the user to allow the user to provide inputs to resume game play of the video game from the transfer point. The inputs from the user during resumption of game play continuing to generate streams of game play data for the video game.

Other aspects of the present disclosure will become apparent from the following detailed description, taken in conjunction with the accompanying drawings, illustrating by way of example the principles of embodiments described in the present disclosure.

BRIEF DESCRIPTION OF THE DRAWINGS

Various embodiments of the present disclosure are best understood by reference to the following description taken in conjunction with the accompanying drawings in which.

DETAILED DESCRIPTION

Figure 1:
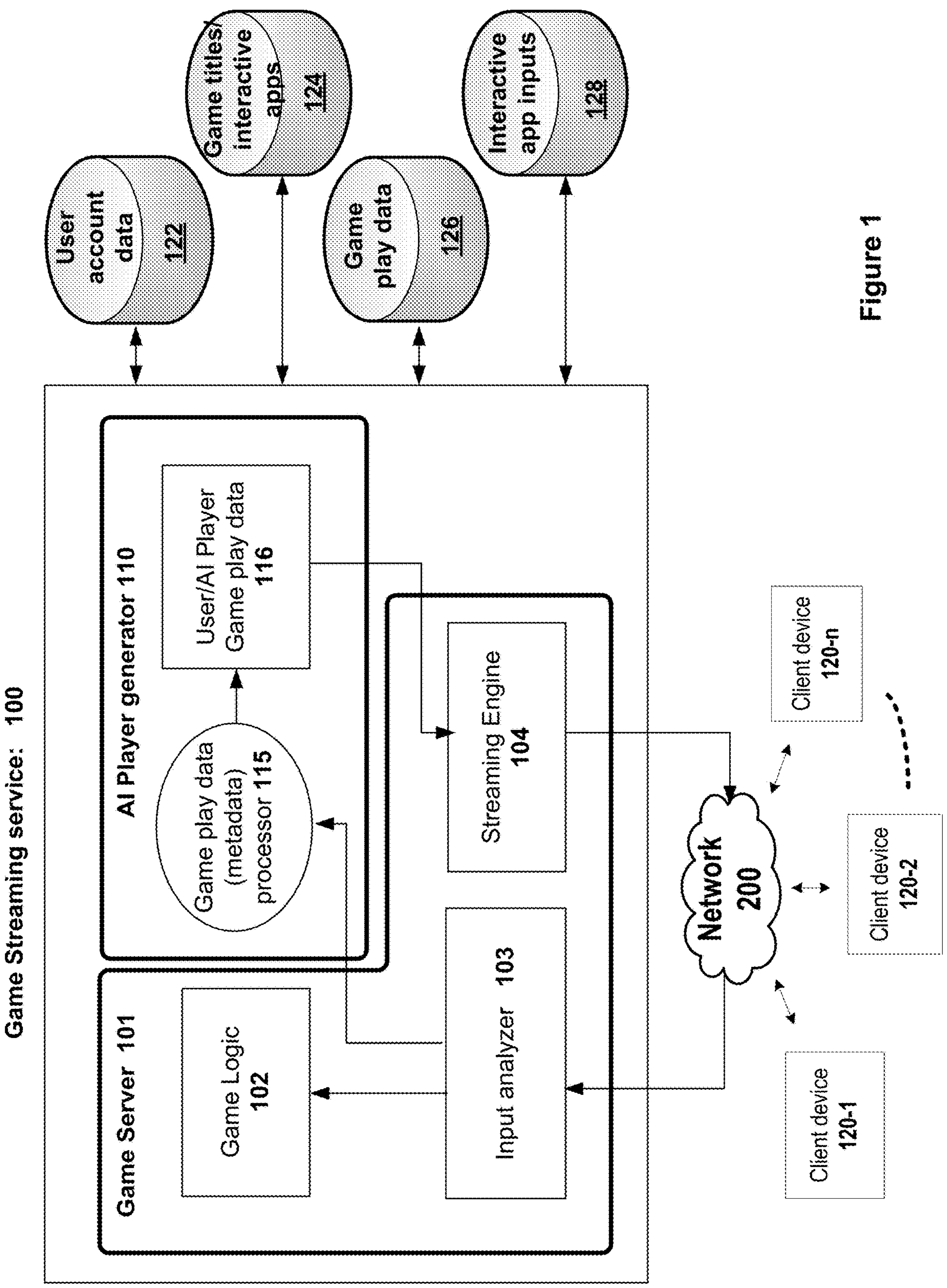
FIG. 1 is a simplified representation of a system that is used to create and train an AI player of a user and use the AI player to play a video game on behalf of the user, in one implementation.

Systems and method for creating and training an artificial intelligence (AI) player for a user, and engaging the AI player to play the video game on behalf of the user are described. It should be noted that various implementations of the present disclosure are practiced without some or all of the specific details. In other instances, well known process operations have not been described in detail in order not to unnecessarily obscure various embodiments of the present disclosure.

The various implementations described herein allow for creating and training an AI player for a user using inputs of the user playing a video game. The training is to allow the AI player to adapt play style of the user. The trained AI player is engaged to represent the user during game play of the video game. The AI player is provided access to the video game of the user. In some implementations, the access is provided to the AI player to allow the AI player to resume game play of the user from a restart point, wherein the restart point is defined to be a point where the user left off during a prior game play session. In some implementations, the restart point is defined from a game play recording generated during the prior game play session of the user or from game state stored for the video game from the prior game play session. In some implementations, the AI player is provided access to the video game so as to allow the AI player to represent the user and play the video game from the start.

The game play of the AI player is recorded and shared with the user. In addition to sharing the video recording of the game play, the user is provided with options to interact with the video recording and/or the video game. For instance, the user is provided with an option to view the video recording of the game play of the AI player. Viewing the video recording allows the user to gauge the game play of the AI player. Based on the game play of the AI player, the user can determine if the AI player should be provided with access to the video game to the AI player to allow the AI player to play the video game on behalf of the user or if the access has to be removed. Alternately or additionally, the user can determine if the play style of the AI player needs to be refined further.

In addition to the view option, the user is also provided with an option to take control of game play of the video game. For example, the user can be viewing the video recording of the game play of the AI player. At any time before, during or after viewing the video recording, the user may express interest in playing at least a portion of the video game. For instance, the user may express interest to provide inputs for an event or to overcome a particular challenge or a task or a certain level in the video game. The user can select the control option and identify the point from which the user wants to take control of game play of the video game from the AI player. The transfer point can be defined from the video recording of the game play of the video game the user is currently viewing. In response, the system identifies and initiates transfer of control of the game play of the video game to the user from the transfer point. The user can continue to play the rest of the video game from the transfer point onward. Alternately, the user can provide inputs to complete the event or the task or the challenge or the level within the portion of the video game, and, once the user is done playing the portion of the video game, they may wish to transfer the control back to the AI player. The user may identify a second transfer point and select the same or a second control option to transfer the control back to the AI player. In response to the user's selection of the control option, the system initiates the transfer of control of the game play of the video game to the AI player from the second transfer point.

The system captures the video recording of the user playing the portion of the video game and of the AI player playing the remaining portion of the video game. The generated video recording is provided for sharing with the user and with other users of the video game. The sharing of the video recording can be done on a user interface. The user interface can provide various options to view the video recording. For example, options may be provided to view the entire video recording, thumbnails of highlighted reels capturing significant events/tasks/challenges of the video game, thumbnails of portions of the video game played only by the user, thumbnails of portions of the video game played only by the AI player, etc. The system thus provides the user with options to allow the AI player to play the video game on their behalf, take control of game play of the video game from the AI player from any point in the video game, and transfer control of game play of the video game back to the AI player. These options allow the user to make optimal use of their own time while experiencing game play of the video game played by the AI player who is trained to mimic the play style of the user. The AI player can be trained to play different video games from the same or different genre, thereby allowing the user to expand on their exposure to the different video games.

With the general understanding of the disclosure, specific implementations of engaging an AI player of a user will now be described in greater detail with reference to the various figures. It should be noted that various implementations of the present disclosure can be practiced without some or all of the specific details. In other instances, well known process operations have not been described in detail in order not to unnecessarily obscure various embodiments of the present disclosure.

FIG. 1 illustrates an example system for providing access to a video game for game play of a user and for generating an AI player to represent the user during game play of the video game, in one implementation. In one implementation, the system is a game streaming service 100 that is configured to host a plurality of video games. The game streaming service 100 includes one or more game servers 101. Each game server 101 is configured to host one or more video games available at the game streaming service. The video games available at the game streaming service 100 are stored in a game titles datastore 124 and retrieved as and when a video game needs to be instantiated. The game server 101 hosts game logic 102 for each video game that is available at the game streaming service 100. The game logic 102 provides details of the video game including genre of game, type of game (i.e., single player or multi-player game), game intensity, number of levels included, challenges, tasks, events included in each level, game scenes, game objects included in each game scene, sequence of operations expected, various routes that can be taken to achieve a goal or a task, various game states defined for different inputs provided to complete each task/challenge/event, etc.

A user initiates a game play session by selecting a video game from a plurality of video games available at the game streaming service 100, and initiating a game play request. The game play request is processed by the game streaming service 100 by first verifying the user using user credentials provided by the user against user profile data of the user stored in user datastore 122. The video games at the game streaming service 100 can be generally made available to all the users or can be selectively made available to certain ones of the users via a subscription service. In the case of the video game being available via subscription service, the user can be additionally verified by querying a game titles datastore 124 to determine if the user has enrolled into the proper subscription service for accessing the video game. Once the user is verified, the user is allowed to initiate the game play of the video game and provide inputs.

The inputs provided by the user are analyzed by an input analyzer component 103 available at the game server 101. The input analyzer component 103 can be part of or can be separate from the game logic 102. The inputs of the user are analyzed to identify the user who is providing the inputs, type of inputs provided, frequency of inputs provided, game scene where the inputs are provided, target of the inputs, identity of game object or game icon or user icon/character being targeted, etc. The game logic 102 processes the inputs provided by the user to generate game state of the video game. The game state provides the status of the video game including status of various game objects, game scenes, and icons/game characters associated with the users within the video game. The game state is used to generate game play data which is provided to a streaming engine 104 for rendering at a client device 120 of the user. Where an instance of the video game is being played by a plurality of users, the game play data generated from inputs of each of the plurality of users are forwarded to respective client devices 120 (120-1, 120-2, . . . 120-*n*) of the plurality of users. The game play data is also stored in game play datastore 126 and retrieved, as and when required.

The streaming engine 104 engages compression technique to compress the game play data, and transmits the compressed game play data to the client device 120 of the user for rendering. The compression logic can use any known or novel compression technique and transmission protocol to compress and package the game play data for transmission to the client device 120 of the user. In some implementations where the game server 101 is remotely located from the client device 120 of the user, the compressed and packaged game play data is transmitted over a network 200 to the client device 120. The transmitted game play data is rendered at a display screen associated with the client device 120 of the user.

The display screen can include liquid crystal display (LCD), a light emitting diode display, or a plasma display. The client device can be a head-mounted display (HMD), a desk-top computer, a lap-top computer, a mobile computing device including smartphones and tablet computing devices, a television or a smart television. The game server can be a game console or a game server that is part of cloud service.

The game state details from the game logic 102 and the game inputs from the input analyzer 103 are provided as inputs to an artificial intelligence (AI) player generator module 110, which employs machine learning (ML) engine to create an AI player to represent the user and to train the AI player using the inputs of the user. As the user continues to engage in game play of the video game and provides additional inputs, the additional inputs are used to further train the AI player representing the user. The training is done to allow the AI player to adapt a play style of the user, which is reflected in the inputs provided by the user. The trained AI player is provided access to the video game and allowed to play the video game on behalf of the user. The inputs provided by the AI player substantially mimic the play style of the user.

In addition to training the AI player with inputs provided by the user for the video game, the AI player can be trained using inputs provided by the user in other interactive applications, such as chat application, social media application, etc. The user's inputs from other interactive applications can provide an insight into the user's behavior and/or interaction style. The inputs provided by the user in other interactive applications are stored in an interactive application (app) inputs datastore 128 and retrieved to train the AI player. The resulting AI player trained in accordance to the play style of the user can be used to substantially mimic the user's behavior when used to provide inputs to the video game and other interactive applications.

Figure 2:
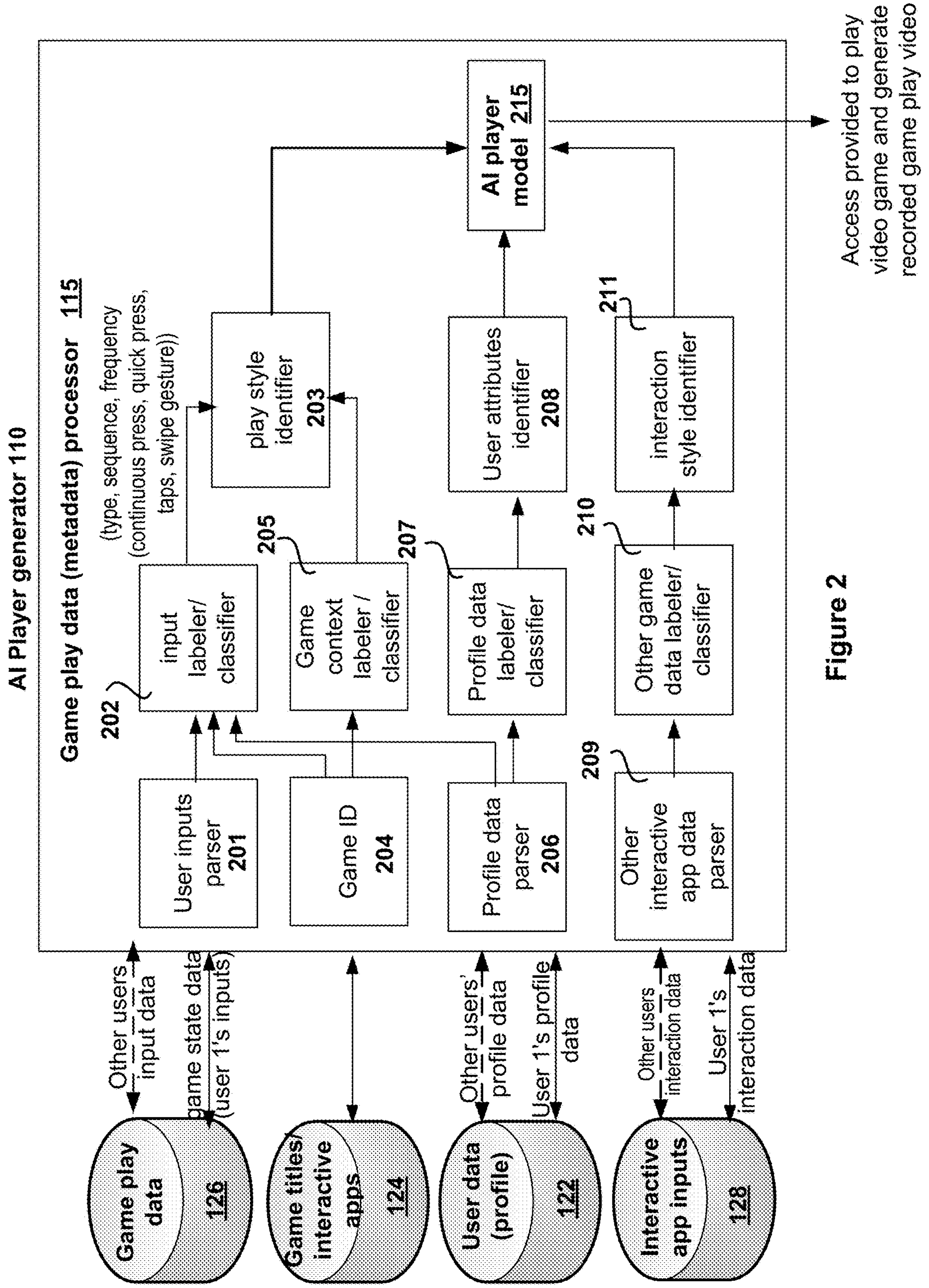
FIG. 2 illustrates various components of an input analyzer used in conjunction with a machine learning (ML) engine to create and train the AI player using inputs provided by the user and from other users, in one implementation.

FIG. 2 illustrates the various components of the game play data processor 115 of the AI player generator 110 used to create and train the AI player for a user, in accordance with one implementation. The game play data processor 115 is configured to process the game play data of the video game generated using inputs of the user. The game play data represents the metadata of the video game and includes details of changes/updates to game state of the video game after processing the inputs of the user. Consequently, the game play data processor 115 is also referred to herein as metadata processor 115. The metadata processor 115 includes a plurality of components including user inputs parser 201, input labeler/classifier 202, play style identifier 203, game identifier 204, game context labeler/classifier 205, profile data parser 206, profile data labeler/classifier 207, profile data identifier 208, other interactive app data parser 209, other game data labeler/classifier 210, interaction style identifier 211, and an AI player model 215. Each of the components of the metadata processor 115 can be a hardware component or a software component. For example, each of the components of the metadata processor 115 can be a software program that is executed by the metadata processor 115 or an artificial intelligence (AI) processor (not shown) within the metadata processor 115 that is part of a server computing device. In one example, the server computing device can be part of a cloud computing service. In this example, the server computing device can be separate from and be communicatively connected to the game server 101. In another example, the game server 101 can be a game console and the metadata processor 115 can be a separate hardware or a software component that is part of the game console. Further, the AI player model 215 is a machine learning model or an AI model or a neural network model. Alternately, each of the components of the metadata processor 115 can be a hardware component. For example, each component can be a portion of a hardware circuit of an application specific integrated circuit (ASIC) or a programmable logic device (PLD).

Each of the parser components is coupled to a corresponding labeler/classifier components and each of the labeler/classifier components is coupled to related identifiers. The data from the identifiers are provided to the AI player model 215 to create and train an AI player for a user. In some implementations, the AI player for the user is trained using the metadata generated by the inputs provided by the user for the video game. In some alternate implementations, the AI player is further trained using the metadata generated from the inputs provided by the user in other interactive applications. As an example, metadata generated from the inputs provided by the user in a chat interface rendered alongside the content of the video game are used to train the AI player. In another example, the metadata generated from the inputs provided by the user in a social media application and/or an email message application and/or a streaming content application are used to further train the AI player of the user. In some implementations, the AI player of the user is further trained using the metadata generated from the inputs of other users in the video game. In other alternate implementations, the AI player of the user is further trained using the metadata generated from the inputs of other users in other interactive applications. The metadata includes details of inputs provided by the user, game state of the video game resulting from applying the inputs of the user, and game data corresponding to the game state of the video game. The AI player thus trained is provided with access to the video game and allowed to provide inputs on behalf of the user during game play of the video game.

When a user initiates a game play of a video game, the user provides user credentials to the game server and selects a game title associated with the video game from a user interface. The metadata processor 115 queries and receives user profile data of the user from user datastore 122 using the user credentials provided by the user. The user datastore 122 stores user profiles of a plurality of users who use the game streaming service 100 for interacting with video games. The user profile of the user includes details of the user including user identifier, biometric data, game/interactive content preferences, user skills, user level, user customizations, any user etc. It should be noted that although various implementations are being described with reference to providing access to video games, the game streaming service 100 can also be configured to provide access to other interactive applications that provide interactive content for user interactions. The metadata processor 115 engages a profile data parser 206 to parse the user profile data of the user to identify the various attributes of the user accessing the game streaming service 100 for game play of the video game.

The metadata processor 115 further queries a game titles datastore 124 using the game title selected by the user and provides details of the video game to the game identifier component 204. The game identifier component 204 uses the details received from the game titles datastore 124 to identify the video game identifier, video game type (action-adventure game, real-time strategy game, role-playing game, simulation game, sports game, etc.), rate (i.e., speed) of the video game, duration of video game, number of levels included, single-player vs. multi-player game, video game context, type of content included (adult or child-appropriate), etc. In addition to maintaining game titles of video games, the game titles datastore 124 can also include titles of other interactive applications and hence could also be referred to herein as game titles/interactive applications datastore 124.

The metadata processor 115 queries and retrieves the metadata for the video game pertaining to the user from the game play datastore 126 and provides it to the user inputs parser 201. The user identification information is provided by the profile data parser 206 and the video game identification information is obtained from the game identifier component 204. The metadata for the video game stored in the game play datastore 126 is generated from the inputs provided by the user during prior game play sessions of the video game and updated as and when additional inputs are provided by the user during subsequent game play sessions. The user inputs parser 201 parses the metadata of the video game to identify the various data included therein including identity of the user providing the input, the type of input provided, frequency of input, game object/game character targeted, game level where the inputs are provided, resulting changes in the game data (e.g., game scene, game state, etc.) of the video game.

The metadata processor 115 then provides the data from the user inputs parser 201 to the input labeler/classifier 202. The input labeler/classifier 202 identifies the various characteristics of data included in the metadata and labels the various details in accordance to the different characteristics, such as origin, destination, location, direction, type, etc. For example, the input labeler/classifier 202 generates label data for an input provided by the user in a particular level using the characteristics, such as type of input provided, level, location and/or direction of input, intended target, input origination, input destination, effect of input, etc. In another example, a label data is generated for an output generated by game logic in response to applying an input from the user. The label data can include labels pertaining to input origin or source (whether a user or game character or game logic providing the input), intended destination (e.g., targeted object or icon or character), position (e.g., coordinates of the origin and destination of the input), location (e.g., game level and location within a game scene within the game level), actual destination, type (e.g., single tap, double tap, left/right swipe, continuous press, button press, etc.), direction, intended purpose (e.g., pertains to an event or a challenge or an accomplishment), to name a few.

The generated label details are used to classify the various inputs and the outputs contained in the metadata. The classification can be done in accordance to specific ones of the labels or all of the labels. For example, the data can be classified in accordance to the source label, the destination label, or the intended purpose label. Where more than one label is used to classify the data, the labels are prioritized in accordance to pre-defined rule(s) and the classification of the data is done in order of priority of the labels. The label is generated to include characteristics of the data resulting from the inputs and the outputs of the video game and the classifier classifies the data in accordance to the one or more characteristics.

The metadata processor 115 engages the game context labeler/classifier to use the game identification information obtained for the game title selected by the user to generate one or more labels for the video game. For example, the labels for the video game are generated in accordance to context, intended audience, genre, type (single vs. multi-player, first person shooter vs. real-time strategy, action vs. simulation, sports or puzzles or party games), etc. The generated labels are then used to classify the video games broadly using a single label or finely using a plurality of labels. The various labels generated for the video game can be used to train an AI player generated for a user, in different ways.

The metadata processor 115 engages profile data labeler/classifier 207 to use the various attributes of the user identified by the profile data parser 206 to generate label(s) for the user. For example, based on the user profile data, the user can be labeled to be an adult user or a child user, an aggressive player or a gentle player, a fast player or a slow player, an experienced player or a novice player, experiences aural or visual challenges, etc. The labeling can be done per video game basis or per user basis. For instance, the user can be labeled to be an experienced player in a first video game and an average or a novice player in a second video game. The user labels are then used to classify the user for the video game so that the content of the video game can be provided in accordance to the classification of the user.

The metadata processor 115 engages a play style identifier component 203 to use the classified inputs and classified game title details to determine the play style of the user. The play style of the user can be specific to the user and to the video game. As the user interacts more and more with the video game, the play style of the users evolves. For example, the user can start off by providing inputs slowly. As the user continues to interact with the video game more and more, the user can start providing faster inputs. The play style of the user identifies the type of inputs that the user is comfortable in providing (button presses vs. swipe gestures, clicks vs. button presses, etc.), game play behavior of the user (e.g., aggressive vs. gentle), capabilities (e.g., providing fast or quick inputs vs. slow inputs), skill level (e.g., experienced vs. novice), etc., of the user.

The metadata processor 115 engages user attributes identifier component 208 to identify the user attributes from the classified profile data. The user attributes identifies the user identification information, user customizations, video game preferences, input device preferences, user challenges/impairments that need to be addressed, etc.

In some implementations, in addition to processing the inputs of the user provided in the video game, the metadata processor 115 can also process the inputs of the user provided in other video games and use the processed data to further refine the play style of the user. In some implementations, the metadata processor 115 can also be used to identify other users who have played the video game and process their inputs to the video game to further refine the play style of the user. The other users are identified by matching the user profile of each of the other users with the user profile of the user. The processing of the inputs of the other users are done in a manner similar to that of the user.

In some implementations, the metadata processor 115 can also process inputs provided by the user in other interactive applications (e.g., chat application, social media application, email/streaming content application) to determine the interactive style of the user. The metadata processor 115 receives other interactive application data from the interactive application inputs datastore 128, parses the interactive application data using the other interactive app data parser 209 to identify the various characteristics of the inputs and uses the other game data labeler/classifier 210 to label and classify the inputs in accordance to the identified characteristics. The classified inputs are then used by the interaction style identifier 211 to identify the interaction style of the user.

The metadata processor 115 then provides the play style of the user identified by the play style identifier 203, the user attributes (i.e., profile data) identified by the user attributes identifier 208, and the interaction style in other interactive applications identified by the user interaction style identifier 211 to the AI player model component 215. The AI player model component 215 uses the details provided by the metadata processor 115 to create and train an AI player for the user. As the user continues to engage in game play of the video game and provide additional inputs, the AI player created for the user is continuously trained using the additional inputs of the user. The trained AI player adapts the play style of the user. The trained AI player of the user is provided access to play the video game on behalf of the user. The inputs provided by the AI player during game play of the video game substantially mimic the play style of the user.

The access allows the AI player to select and play the video game in a subsequent game play session. When the AI player accesses and plays the video game on behalf of the user, the game play is recorded and shared with the user and other users. The video recording is generated to include internal game states and game scenes that correspond with the internal game states of the video game at different points of time. The video recording is stored on the server for subsequent viewing by the user and other users. As the game play of the AI player mimics the play style of the user, the video recording of the game play of the AI player, when viewed by the user, will appear as though the user played the video game rather than the AI player. The user can view the pre-recorded video, fast forward and skip certain events/tasks, or rewind to review certain other tasks/events. The internal game states included in the video recording allows the user to take over control of game play of the video game from any point of the recording.

To assist the user to view the recording and/or take control of game play of the video game from any point of the recording, the video recording of the AI player's game play of the video game is provided on a user interface with options to perform appropriate actions (e.g., view a portion or entire recording or take control). The options can include an option to view the entire video recording, options to view specific portions (i.e., highlighted reels) of the video recording, and an option to control game play of the video game. The options to view specific portions include options to view highlighted reels that are event-specific, task or challenge-specific, game level-specific, input style/skill-specific (e.g., a specific sequence used, specific frequency of input, etc.), etc. Based on the option selected, the user can see the inputs provided by the AI player in the specific portion or the entirety of the game play of the AI player.

The option to control the game play can include an option to select a specific point in the video recording from where the user wants to take control of game play of the video game. The internal game states included in the video recording are used to identify the location within the video game that corresponds with the specific point selected by the user and the video game is loaded for game play from that specific point onward. The specific point selected by the user for taking control of game play of the video game is referred to as a "transition" point as it corresponds to the transition of the game play of the video game to the user. The metadata processor 115 receives the user selection of the option to control game play of the video game, identifies the transition point selected by the user from the video recording, and generates a signal to the game logic 102 executing on the game server 101 to load the appropriate portion of the video game and instantiate the video game ready for game play by the user from the transition point so that the user can resume game play of the video game from the transition point. The game play of the user from the transition point is used to generate the video recording of the game play of the user for the video game. The video recording of the game play of the user are stored on the game server 101 or at the game streaming service 100 and shared with other users. Additionally, the inputs provided by the user are used to further train the AI player. In some implementations, the video recording of the game play of the video game from the transition point is used to replace the portion of the video recording of the video game of the AI player from the transition point to generate a new video recording of the video game that includes a first portion of game play by the AI player and a second portion of the game play by the user. In alternate implementations, the portion of the game play of the user is used to generate a separate video recording for the video game, wherein the video recording of the user includes the game play of the portion of the video game. In both the implementations, the video recording of the AI player and of the user are shared with other users.

In some implementations, transitioning control of the game play of the video game is done by identifying the transition point from the video recording of the video game from a prior game play session of the AI player. For example, the user can be viewing the video recording of the game play of the AI player generated during a prior game play session, and at some point of the viewing express interest to take control of the game play. The user can express interest by selecting the option to transition control of the video game to the user from the user interface rendered with the video recording and, in response, the control of game play is transitioned to the user from the transition point. In alternate implementations, the user may express interest to transition control of the game play of the video game from the AI player to the user during a current streaming game play session of the AI player. For example, the AI player of the user can have gained access to the video game and begun to play the video game on behalf of the user. The game play data is streamed in substantial real-time to the client device of the user for rendering, as the AI player is providing inputs to the video game during a current game play session. At any time during the streaming of the game play of the video game of the current game play session, the user can take over control of game play of the video game from the AI player by selecting the transition option. In response to the request from the user, control of the game play of the video game is transitioned to the user and the transition point is defined to correspond with a frame of the streaming game play data that was rendering when the control request was received. In response to receiving the transition request, the metadata processor 115 generates a signal to deactivate the AI player to prevent the AI player from providing inputs to the video game, and to activate controls of the input devices associated with the user to allow the user to provide inputs to the game play of the video game during the current game play session. The game play of the video game is recorded and shared with the other users.

The user can play a portion of the video game from the transition point and then desire to transfer control back to the AI player to allow the AI player to continue the game play of the current game play session. To assist in transferring control back to the AI player, the options provided on the user interface can also include an option to transfer control of the video game back to the AI player, in some implementations. For example, the user viewing the video recording of game play of the AI player can decide to take control of the game play of the video game so as to play at least a portion of the video game. The user selects the transition option and identifies the transition point from where the user wants to resume the game play of the video game. After the user has completed playing the portion of the video game, the user may wish to transfer the control back to the AI player to allow the AI player to continue the game play of the video game. It should be noted that the transfer option is available during a current play session where the game play is being streamed to the client device and the control can be switched between the AI player and the user. The transfer option provides access and transfers control of the game play to the AI player and also generates signals to the game logic 102 to recognize the access request for the video game from the AI player and the inputs from the AI player. As part of recognizing the inputs of the AI player, the game logic 102 applies the inputs of the AI player in a manner similar to the application of the inputs of the user to affect game state of the video game.

The user can select the transfer option from the user interface. In response to detecting selection of the transfer option, a transfer point from where the user likes to transfer the control back to the AI player is identified. The transfer point is defined to correspond with the frame of game play data that was being rendered when the transfer option was selected by the user. In response to detecting selection of the transfer option by the user, the metadata processor 115 generates signals to, (a) activate the AI player to allow the AI player to access and resume game play by providing inputs to the video game from the transfer point onward, (b) recognize the inputs of the AI player, (c) deactivate controls of input devices of the user used to provide inputs to the video game during game play, and (d) the game logic 102 to recognize and apply the inputs provided by the AI player when the game play of the video game is resumed by the AI player from the transfer point onward. The game play data generated for the video game identifies the transfer point from where the game play of the video game was resumed by the AI player and the resulting game state upon applying the inputs of the AI player. Video recording is generated for the game play and shared with the user and other users.

In one example where the user has selected both the transition option and the transfer option during the rendering of the video recording of the AI player, the resulting video recording generated for the video game includes the game play of the user interspersed with game play of the AI player. In another example where the user has selected only the transition option during the rendering of the video recording, the resulting video recording includes the game play of the AI player followed by the game play of the user. In yet another example where the user has selected only the transition option or both the transition option and the transfer option from the video recording, the video recording of the game play of the user can be generated and maintained separate from the video recording of the game play of the AI player. In another example where the user has selected the transition option and the transfer option during the current game play session, a single video recording can be generated for the video game to include the game play of the AI player and the user or separate video recordings can be generated for the video game with a first video recording capturing the game play of the AI player and the second video recording capturing the game play of the user.

The various implementations described herein allow the user to engage an AI player to play the video game on their behalf and have the ability to take control of the game play of the video game at any time during the game play. By providing access to the AI player, the user is able to perform other tasks while continuing to enjoy the video game. Where the AI player is created and trained using the inputs of the user within a particular video game, the inputs provided by the AI player in the particular video game mimic the play style of the user. As a result, the user can enjoy the game play of the AI player as though the user played the video game and provided the inputs. Where the AI player is trained using the inputs of the user in different video games and or other interactive applications, the inputs provided by the AI player can substantially mimic the play style of the user. Where the AI player is trained using the inputs of not only the user but also other users in a group, the AI player substantially mimics the play style of the group of users. Each of the other users included in the group are selected by matching their user profile with the user profile of the user.

Figure 3A:
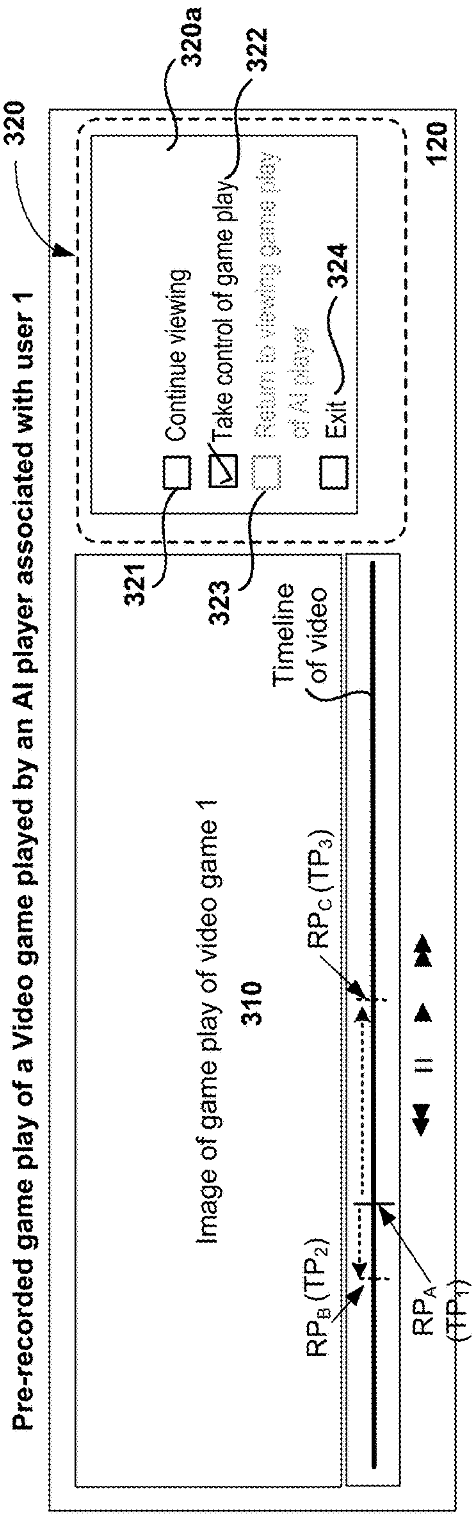
FIG. 3A illustrates an example user interface provided to a user with options for interacting with a pre-recorded video of game play of a video game, including an option to view pre-recorded game play of a video game played by the AI player of a user, in one implementation.
Figure 3B:
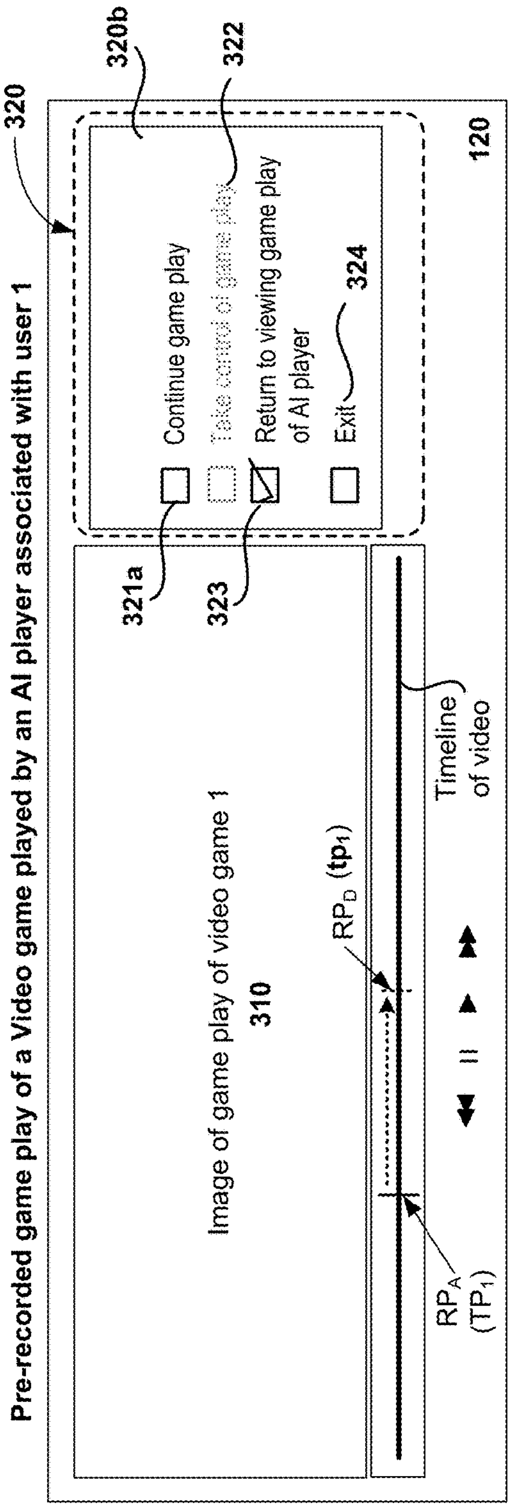
FIG. 3B illustrates another example user interface provided to the user with options including an option to transfer control of game play to the AI player of the user, in one example implementation.

FIGS. 3A and 3B illustrate example user interfaces provided to the user on a display screen of a client device 120 with different options for interacting with the video game, in some implementations. The display screen includes a first portion 310 where images from a video recording of the video game resulting from a game play of an AI player is being rendered, and a second portion 320 rendering a user interface for interacting with the video recording. Along with the video recording, a timeline with option buttons to allow the user to play, pause, fast forward or rewind to a different portion of the video recording is also rendered in the first portion 310. FIG. 3A shows an example user interface rendered in the second portion 320 with a first set of options *320a* for interacting with the video recording of the video game. The first set of options *320a* includes a continue-viewing option 321, a take-control option 322, a transfer-control option 421, and an exit option 324. In the case where the user is viewing the video recording of the AI player, the transfer-control option 421 is greyed out and is not available to the user for selection as the user is just viewing and is not currently in control of the game play. The video recording that is being rendered is from a prior game play session of the AI player.

When the user decides to take control of the game play of the video game at some point during the viewing of the game play of the AI player, the user selects the take-control option 322. The selection is shown as a check mark at take-control option 322 in FIG. 3A. The time of selection of the take-control option 322 by the user is used to identify a transition point $TP_1$ on the timeline of the video recording, and use the transition point $TP_1$ and the internal game states of the video game included in the video recording to determine a resume or restart point $RP_A$ of the video game from where the control of game play is to be transitioned to the user to allow the user to resume game play of the video game. As noted, the video recording is interactive and allows the user to fast forward to a future scene or rewind to an earlier scene. Consequently, the user can select the transition point $TP_1$ from a game scene that is currently rendering on the display screen that corresponds to the restart point $RP_A$ of the video game, rewind to an earlier scene to identify transition point $TP_2$ on the timeline that corresponds to restart point $RP_B$ of the video game or fast forward to a later scene to identify transition point $TP_3$ on the timeline that corresponds to restart point $RP_C$, as shown in FIG. 3A. In response to detecting selection of the take-control option 322 and identifying the transition point TP ($TP_1$, $TP_2$ or $TP_3$) from where the user intends to take control, the metadata processor 115 pauses the rendering of the video recording, identifies the corresponding restart point RP (e.g., $RP_A$, $RP_B$ or $RP_C$) in the video game, and generates a signal to the game logic 102 of the video game to execute an instance of the video game starting from the restart point RP that corresponds with the transition point TP selected by the user. In some implementation, take-control option 322 can include additional sub-options to determine if the user wants to play only the portion identified from the transition point $TP_1$ (e.g., the portion having an event, a challenge, a task, or a level included therein), or can include the remaining portion of the game from the transition point $TP_1$ onwards. Depending on the option, sub-options selected, the appropriate restart point RP and the appropriate portion of the video game are identified and the game logic 102 generates and loads an instance of the video game for or from the appropriate portion. The user resumes the game play of the video game by interacting with the instance provided by the game logic 102. The user's interactions with the video game are used to generate the video recording of game play of the user.

For example, when the user has elected to play only a portion of the video game defined by the transition point $TP_1$, the video recording generated for the portion of the game play of the user can be stored separately and shared with other users. In alternate implementations, the video recording of the portion of game play of the user is used to generate a new video recording by replacing the video recording of the game play of the AI portion for the portion with the video recording of the game play of the user. The new video recording thus includes game play of the AI player interspersed with the game play of the user. The new video recording with the AI player's and the user's game play is stored separately from the existing video recording generated from the AI player's game play and shared with the users as appropriate.

FIG. 3B illustrates the timeline of the video recording identifying the transition point $TP_1$ from where the user took control of game play of the video game and the transfer point $tp_1$ (i.e., resumption point ($RP_B$) from where the user intends to resume viewing game play of the AI player. Further, the user interface illustrated in the second portion 320 of FIG. 3B shows different options 320*b* than what is shown in the user interface of FIG. 3A. The user interface provides the options 320*b* for the user after taking control of game play of the video game. The options 320*b* included in the user interface include a "continue game play" option 321*a*, a "take-control" option 322, a "return to viewing game play" (or simply "return to viewing") option 323 and an exit option 324. The take-control option 322 is greyed out as the user has already taken control of game play and is currently interacting with the video game. After playing the particular portion identified by the transition point $TP_1$, the user can select "Return to viewing game play" option 323 to continue to view game play of the AI player. A transfer point ($tp_1$) in the timeline which corresponds to resume game play point $RP_D$ of the video game is identified in response to the user selection of return to viewing option 323, and in response to the user selection, the metadata processor 115 adjusts the position of the video recording of the game play of the AI player to start rendering the game play from the transfer point $tp_1$ onward. The transfer point $tp_1$ is identified to be a point in the video game that is after the portion of the video game that the user played after taking control of the video game.

Alternately, the user can pause to take a breather and after some time wish to resume the game play. When the user is ready to resume the game play of the video game, the user can select the "Continue game play" 321*a* option and continue the game play from where they paused. The video recording of the game play of the user is generated and shared with other users.

Figure 4A:
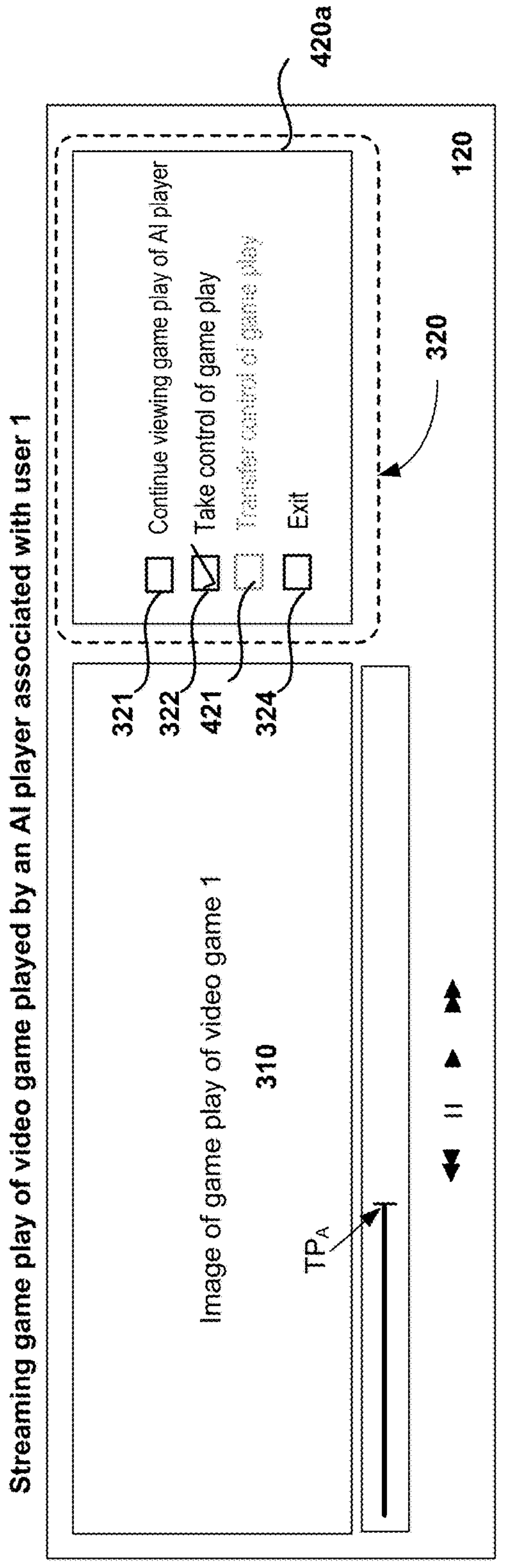
FIGS. 4A and 4B illustrate examples of streaming game play data of a video game currently played by an AI player of a user with options to view and/or transfer control of game play from the AI player to the user or vice versa, in some implementations.
Figure 4B:
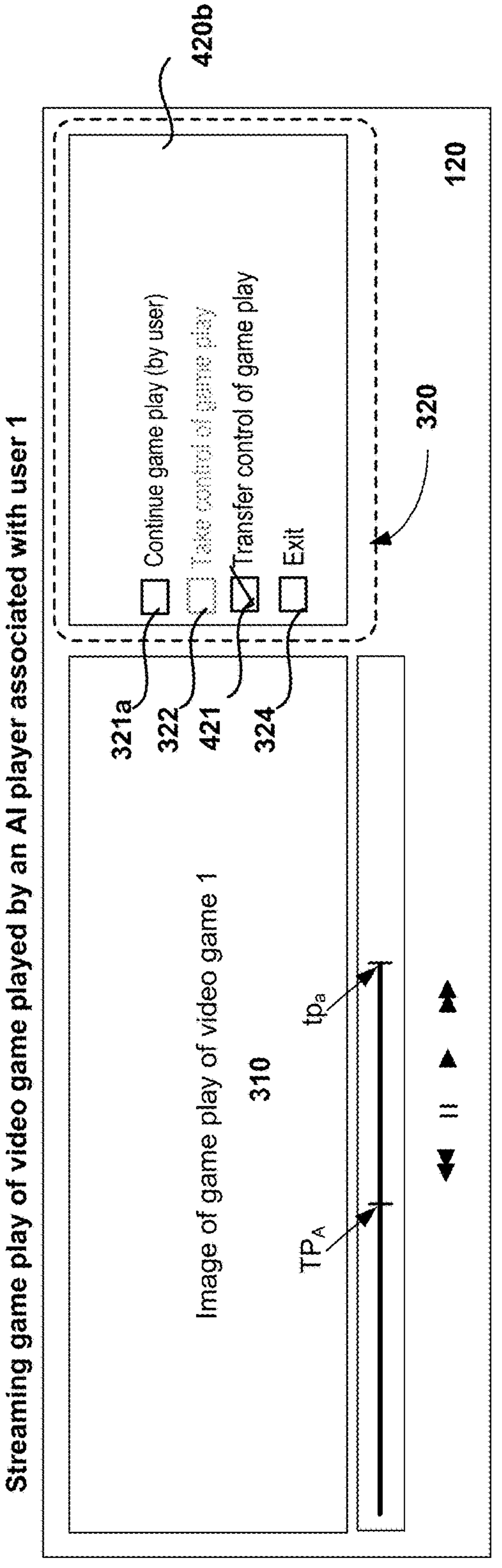

FIGS. 4A and 4B illustrate another example of a user interface used for interacting with the game play data from game play of the AI player, in some alternate implementations. For example, the game play data that is being rendered in a first portion 310 of the display screen of the client device 120 is streaming game content generated from a live game play session (i.e., a current game play session) where the AI player has been engaged to provide inputs to the video game on behalf of the user. A user interface is rendered in the second portion 320 of the display screen. The user interface rendered in the second portion 320 includes options 420*a* for interacting with the streaming game content, wherein the options 420*a* are slightly different from the options 320*a* shown in FIG. 3A. For example, the options 420*a* includes a "transfer-control" option 421 instead of the "return to viewing" option 323 with all other options 420*a* in the user interface being similar to the options 320*a* included in the user interface of FIG. 3A. In the options 420*a*, the transfer-control option 421 is greyed out as the game play is being controlled by the AI player. The options in 320*a*, 420*a* that are common between FIGS. 3A and 4A function in a similar manner. When the user selects the "take-control" option 322, as shown by the check mark at take-control option 322 in FIG. 4A, the control of game play of the video game is transitioned from the AI player to the user so that the user can start playing the video game from the transition point $TP_A$ identified when the take-control option 322 was selected. In response to the user selection of the take-control option 322, the metadata processor 115 sends a signal to inactivate the AI player in order to prevent the AI player from providing inputs to the video game, and to activate the input controls of the input devices associated with the user so that the user can provide the inputs to affect the game state of the video game. The game play data generated from the user inputs are streamed to the client device for rendering.

Once the control of the video game is transitioned from the AI player to the user, the take-control option 322 is greyed out (i.e., inactivated) and the transfer-control option 421 is activated. FIG. 4B illustrates an example of options 420*b* rendered on the user interface in the second portion 320 with the transfer-control option 421 activated and the take-control option 322 deactivated. The transfer-control option 421 is provided to allow the user to transfer control back to the AI player at any time during game play of the video game. When the user selects the transfer-control option 421, as shown by the check mark at transfer-control option 421 in the user interface rendered in the second portion 320 of FIG. 4B, control of the game play of the video game is transferred from the user back to the AI player at transfer point '$tp_a$', as shown in the timeline of FIG. 4B. The transfer of control is initiated by activating the AI player to allow the AI player to provide the inputs, and deactivating the input controls at the input devices associated with the user to prevent the user from providing inputs to the video game. From the timeline illustrated in FIG. 4B, it can be seen that the user controlled the game play from transition point $TP_A$ to transfer point $tp_a$ and the AI player controlled the game play from the start of the video game to the transition point $TP_A$ and from transfer point $tp_a$ onwards. The video recording generated using the inputs from both the AI player and the user are stored and shared with other users.

Figure 5A:
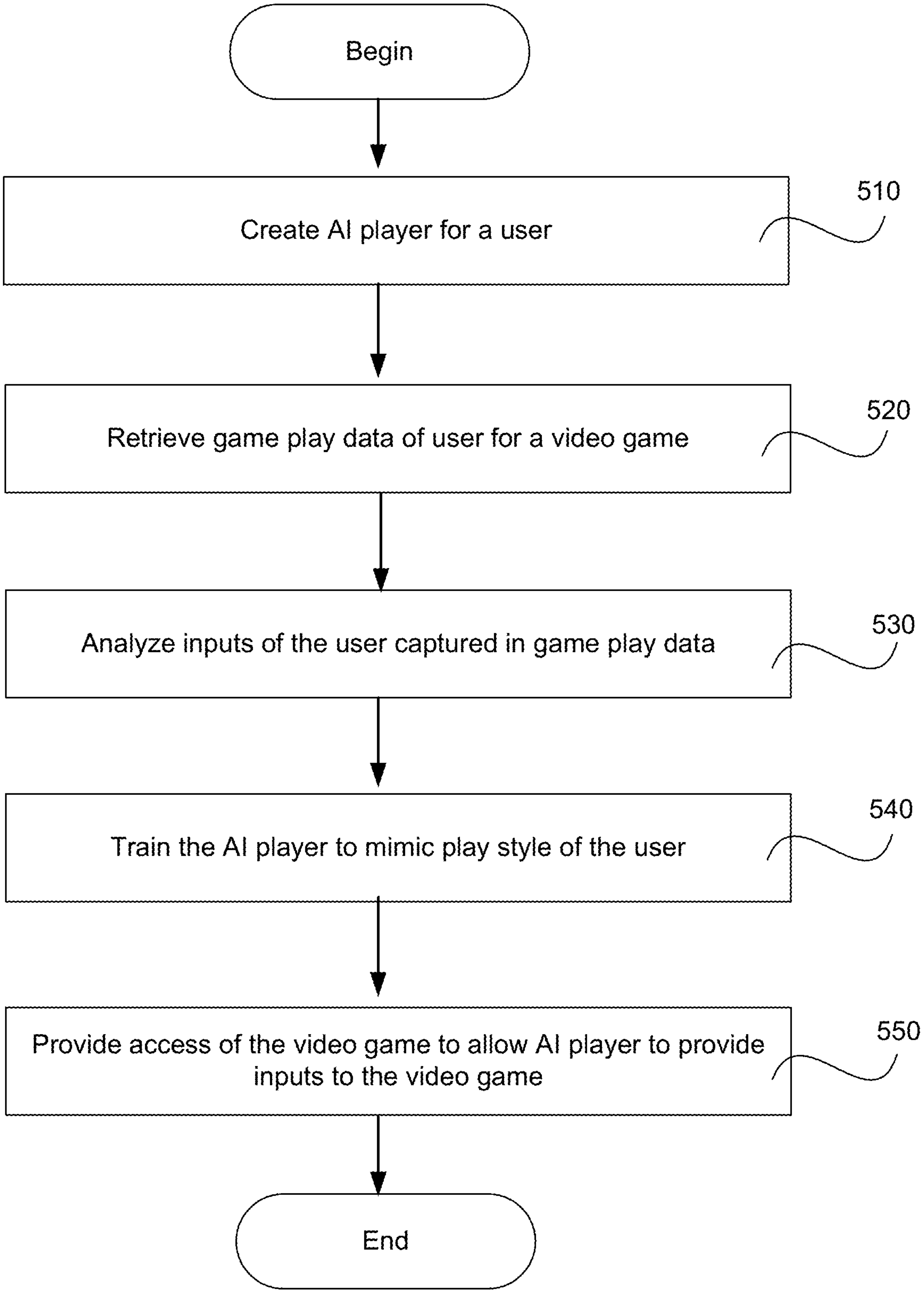
FIG. 5A illustrates flow of operations of a method for engaging an AI player of a user to play a video game on behalf of the user, in one example implementation.

FIG. 5A illustrates flow of operations of a method used to create and train an AI player representing a user and engage the AI player for interacting with a video game on behalf of the user, in some implementations. The method begins at operation 510 where the AI player is created for the user. The AI player is created using at least some of the user attributes retrieved from a user profile of the user. At operation 520, game play data of the video game is retrieved from game play datastore for analysis, wherein the game play data that is retrieved corresponds to inputs provided by the user during prior game play sessions of the video game. The game logic of the video game applies the inputs of the user to affect the game state of the video game and the generated game play data captures details of the inputs and the game states of the video game as a result of applying the inputs of the user.

The details of inputs included in the retrieved game play data are analyzed to identify a play style exhibited by the user during game play of the video game, as illustrated in operation 530. The play style is unique to the user and identifies, for example, type of inputs preferred, speed, sequence, type of challenges/tasks/events attempted, the user's comfort level in attempting the challenges/tasks/events based on success/failure rate, etc. In one example, the play style of the user is determined using the details of the inputs provided for the video game. In another example, the play style of the user is determined using the inputs provided by the user for different video games and/or other interactive applications. This may be the case when there is not sufficient input details from user interaction available for the video game either due to the user having not played the video game at all or has played it occasionally over a long period of time. In another example where there is not much input details available for the user for the video game or other video games/interactive applications, the input details of other users are used to predict a play style of the user. The other users are identified by matching user attributes of the user with the user attributes of other users maintained in the respective user profiles within the user datastore.

The details of the inputs provided by the user for the video game and/or other video games, and/or the inputs provided by the other users for the video game and/or other video games are used to train the AI player created for the user, as illustrated in operation 540. As the AI player is trained using the details of inputs of the user or other users who have similar profile as the user, the AI player will substantially mimic the play style of the user. The trained AI player is provided access to the video game to allow the AI player to play the video game, as illustrated in operation 550. The access allows the AI player to provide inputs during game play of the user that is similar to the way the user provides the inputs. The game inputs provided by the AI player are used to affect the game state of the video game and to generate the game play data. A video recording is generated for the game play of the AI player using the inputs provided by the AI player and is made available to the user and to other users. In some implementations, the AI player plays the video game when the user is not available and the video recording of the game play of the AI player keeps track of when and how the AI player played the video game. The user can access and view the video recording of the game play of the AI player as though they are watching some other user's game play but is from the AI player who plays exactly as the user.

As noted, the video game can be hosted by a cloud service and the user/AI player can access the video game from a cloud server as part of cloud gaming. Sometimes, the cloud gaming can introduce latency in providing the game play data to the client device for rendering. This can be due to reduced bandwidth available during the time or due to other network issues, or can be due to allocation of resources at the cloud server. As a result of latency, the frames of game play data forwarded to the client device may not be ready in time of transmission. This can be the case with both the video recording of prior game play of the AI player and/or user and the live streaming from current game play station. To ensure that the client device is able to present the video game without latency, in some implementations, one or more subsequent frames of the game play data presented at the client device can be extrapolated based on an assumption that the behavior of the user/AI player would be similar to what was determined from prior frames of game play data. In some implementations, the extrapolation of the game play data is done at the client device where the game play data is being rendered for user consumption.

Figure 5B:
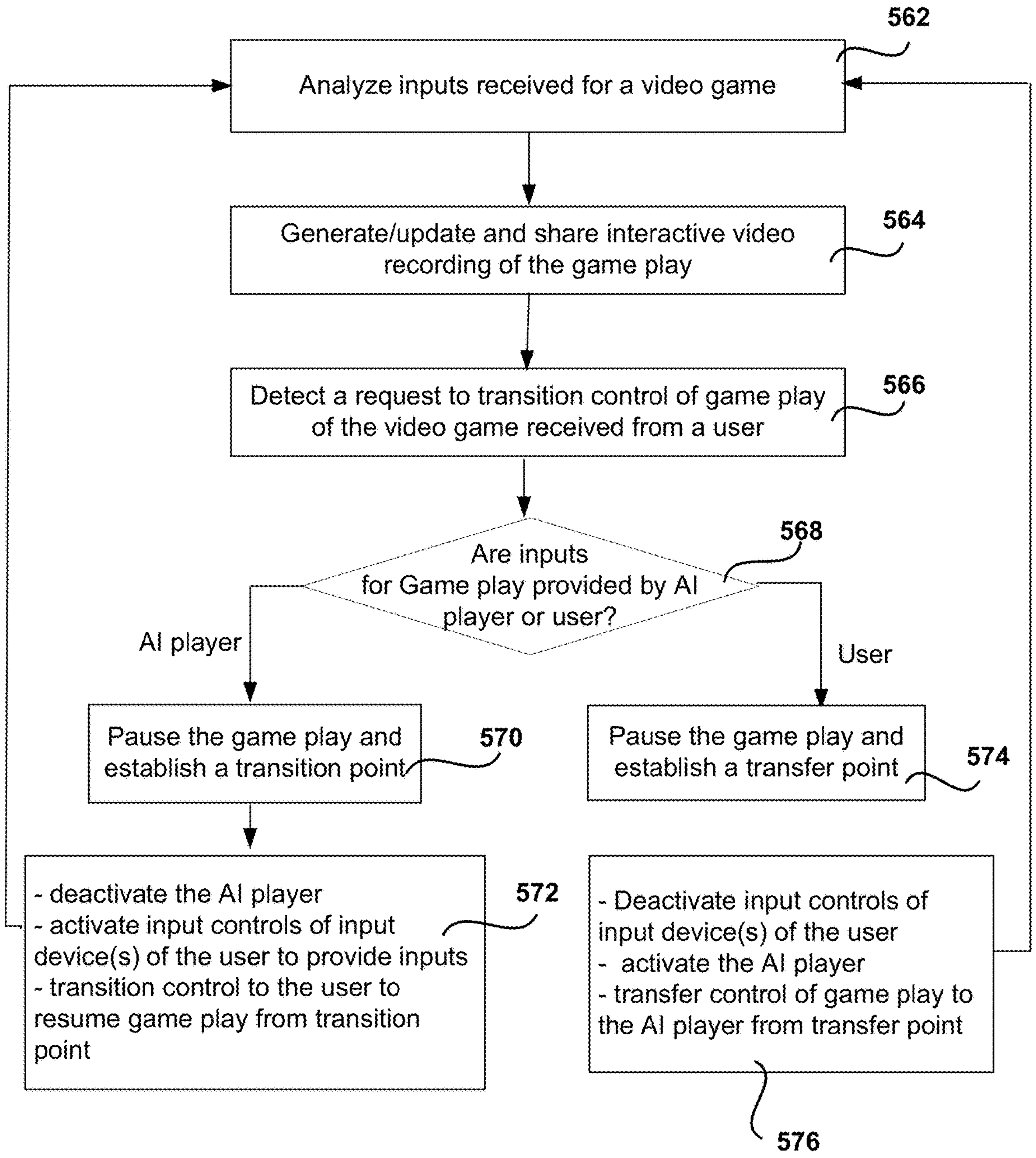
FIG. 5B illustrates flow of operations of a method for engaging an AI player of a user to play a video game on behalf of the user, in an alternate implementation.

FIG. 5B illustrates flow of operations of a method where an AI player generated for a user is engaged to play the video game on behalf of the user, in some implementations. The method begins at operation 562 where inputs received for a video game is analyzed. The video game can be instantiated in response to a request for game play received from either a user or an AI player of the user. The user can initiate the request and designate the AI player to play the video game on behalf of the user. In response to the request, a current game play session is established and the video game is set up for game play by the AI player. The inputs provided by the AI player are analyzed to determine the input attributes, which are used to affect a game state of the video game and to generate the game play data. The game play data includes details of the inputs, the game state of the video game, and the game scene(s) that correspond to the game state. The game play data including the game scenes are streamed to the client device of the user for rendering on a display screen associated with the client device.

A video recording for the video game capturing the game play of the AI player is generated, as illustrated in operation 564. The video recording is stored for subsequent use. The video recording can be shared with the user and the other users.

A request to transition control of game play of the video game is detected during the game play of the AI player, as illustrated in operation 566. The request is received from the user during the current game play. In response to detecting the request to transition control, the metadata processor 115 pauses the game play of the video game and establishes a transition point to transition control from the AI player to the user, as illustrated in operation 570. In response to detecting establishment of the transition point, the metadata processor 115 generates a signal to deactivate the AI player to prevent the AI player from providing inputs to the video game, activate input controls of input devices of the user to allow the user to provide the inputs to the video game, and transition control of game play to the user to allow the user to resume game play of the video game from the transition point onwards, as illustrated in operation 572. When the user resumes game play and provides inputs to the video game, the process returns to operation 562 where the inputs provided by the user are analyzed, the game play data streamed to the client device is updated to reflect current game state, and the video recording recording of the game play is updated to include game play data from the user's game play.

At some point after the user has resumed game play of the video game from the transition point, the user may wish to transfer control of the video game back to the AI player. For example, the user may play a portion of the video game from the transition point onward and after completing playing of the portion, the user may wish to transfer the control back to the AI player to allow the AI player to resume game play of the video game. The user initiates a second request to transfer control of the game play of the video game to the AI player by selecting an appropriate option on a user interface rendered with the game scenes of the video game provided to the client device for rendering. The metadata processor 115 detects the second request initiated by the user, as illustrated in operation 566. In response to detecting the second request from the user, the metadata processor 115 determines if the inputs provided to the video game is originating from the user or the AI player of the user, as illustrated in decision box 568. As the control of the game play of the video game is with the user at the time the second request is detected, the process flows to operation 574 on the right side operation of decision box 568. At operation 574, the game play of the video game controlled by the user is paused and a transfer point is established to transfer control of the video game from the user to the AI player, wherein the transfer point is different from the transition point. Further, the transfer point appears later in the video game and the transition point appears earlier.

After establishing the transfer point, the method flows to operation 576 where the inputs controls of the inputs device (s) of the user used to provide inputs to the video game are deactivated, the AI player is activated to allow the AI player to provide inputs to the video game, and the control of the game play of the video game is transferred from the user to the AI player, as illustrated in operation 576. When the AI player resumes game play of the video game from the transfer point, the inputs from the AI player are received and the process returns to operation 562 where the inputs provided by the AI player are analyzed, the game play data streamed to the client device is updated to reflect current game state, and the video recording recording of the game play is updated to include game play data from the AI player's game play. The process continues till the end of the video game or till the user exits the video game.

Figure 6:
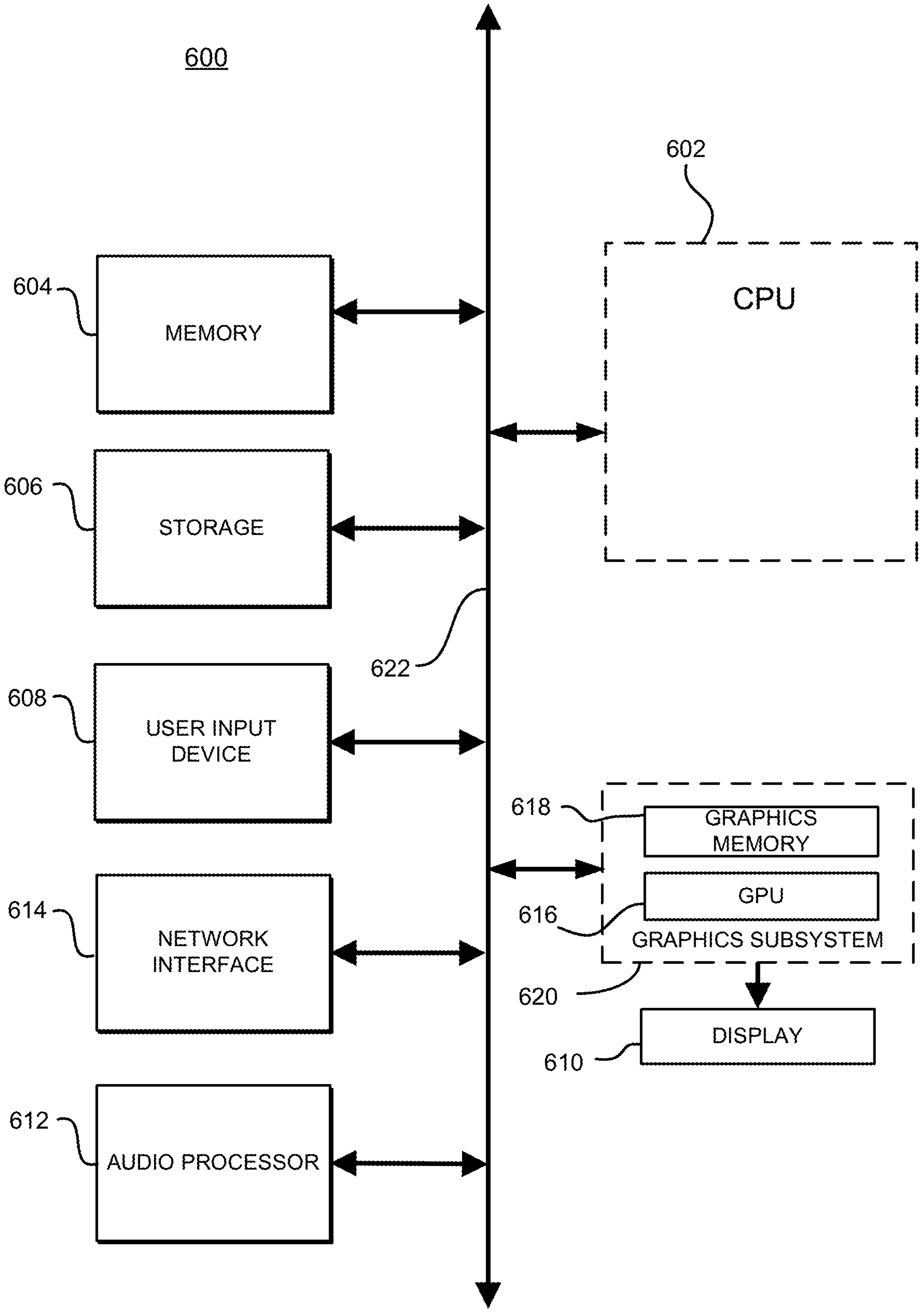
FIG. 6 illustrates components of an example device that can be used to perform aspects of the various implementations of the present disclosure.

FIG. 6 illustrates components of an example device 600 that can be used to perform aspects of the various embodiments of the present disclosure. This block diagram illustrates the device 600 that can incorporate or can be a personal computer, video game console, personal digital assistant, a server or other digital device, suitable for practicing an embodiment of the disclosure. The device 600 includes a CPU 602 for running software applications and optionally an operating system. The CPU 602 includes one or more homogeneous or heterogeneous processing cores. For example, the CPU 602 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. The device 600 can be a localized to a player playing a game segment (e.g., game console), or remote from the player (e.g., back-end server processor), or one of many servers using virtualization in a game cloud system for remote streaming of gameplay to clients.

A memory 604 stores applications and data for use by the CPU 602. A data storage 606 provides non-volatile storage and other computer readable media for applications and data and may include fixed disk drives, removable disk drives, flash memory devices, compact disc-ROM (CD-ROM), digital versatile disc-ROM (DVD-ROM), Blu-ray, high definition-DVD (HD-DVD), or other optical storage devices, as well as signal transmission and storage media. User input devices 608 communicate user inputs from one or more users to the device 600. Examples of the user input devices 608 include keyboards, mouse, joysticks, touch pads, touch screens, still or video recorders/cameras, tracking devices for recognizing gestures, and/or microphones. A network interface 614 allows the device 600 to communicate with other computer systems via an electronic communications network, and may include wired or wireless communication over local area networks and wide area networks, such as the internet. An audio processor 612 is adapted to generate analog or digital audio output from instructions and/or data provided by the CPU 602, the memory 604, and/or data storage 606. The components of device 600, including the CPU 602, the memory 604, the data storage 606, the user input devices 608, the network interface 614, and an audio processor 612 are connected via a data bus 622.

A graphics subsystem 620 is further connected with the data bus 622 and the components of the device 600. The graphics subsystem 620 includes a graphics processing unit (GPU) 616 and a graphics memory 618. The graphics memory 618 includes a display memory (e.g., a frame buffer) used for storing pixel data for each pixel of an output image. The graphics memory 618 can be integrated in the same device as the GPU 616, connected as a separate device with the GPU 616, and/or implemented within the memory 604. Pixel data can be provided to the graphics memory 618 directly from the CPU 602. Alternatively, the CPU 602 provides the GPU 616 with data and/or instructions defining the desired output images, from which the GPU 616 generates the pixel data of one or more output images. The data and/or instructions defining the desired output images can be stored in the memory 604 and/or the graphics memory 618. In an embodiment, the GPU 616 includes three-dimensional (3D) rendering capabilities for generating pixel data for output images from instructions and data defining the geometry, lighting, shading, texturing, motion, and/or camera parameters for a scene. The GPU 616 can further include one or more programmable execution units capable of executing shader programs.

The graphics subsystem 620 periodically outputs pixel data for an image from the graphics memory 618 to be displayed on the display device 610. The display device 610 can be any device capable of displaying visual information in response to a signal from the device 600, including a cathode ray tube (CRT) display, a liquid crystal display (LCD), a plasma display, and an organic light emitting diode (OLED) display. The device 600 can provide the display device 610 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the operations may be a server unit, a virtual machine, or a container, depending on the needs of each game engine segment. For example, if a game engine segment is responsible for camera transformations, that particular game engine segment may be provisioned with a virtual machine associated with a GPU since it will be doing a large number of relatively simple mathematical operations (e.g., matrix transformations). Other game engine segments that require fewer but more complex operations may be provisioned with a processing entity associated with one or more higher power CPUs.

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and an input/output (I/O) interface. The client device can be a personal computer (PC), a mobile phone, a netbook, a personal digital assistant (PDA), etc. In one embodiment, the network executing on the game server recognizes the type of device used by the client and adjusts the communication method employed. In other cases, client devices use a standard communications method, such as html, to access the application on the game server over the internet. It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device system, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

In an embodiment, although the embodiments described herein apply to one or more games, the embodiments apply equally as well to multimedia contexts of one or more interactive spaces, such as a metaverse.

In one embodiment, the various technical examples can be implemented using a virtual environment via the HMD. The HMD can also be referred to as a virtual reality (VR) headset. As used herein, the term "virtual reality" (VR) generally refers to user interaction with a virtual space/environment that involves viewing the virtual space through the HMD (or a VR headset) in a manner that is responsive in real-time to the movements of the HMD (as controlled by the user) to provide the sensation to the user of being in the virtual space or the metaverse. For example, the user may see a three-dimensional (3D) view of the virtual space when facing in a given direction, and when the user turns to a side and thereby turns the HMD likewise, the view to that side in the virtual space is rendered on the HMD. The HMD can be worn in a manner similar to glasses, goggles, or a helmet, and is configured to display a video game or other metaverse content to the user. The HMD can provide a very immersive experience to the user by virtue of its provision of display mechanisms in close proximity to the user's eyes. Thus, the HMD can provide display regions to each of the user's eyes which occupy large portions or even the entirety of the field of view of the user, and may also provide viewing with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with. Accordingly, based on the gaze direction of the user, the system may detect specific virtual objects and content items that may be of potential focus to the user where the user has an interest in interacting and engaging with, e.g., game characters, game objects, game items, etc.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD the real-world objects, and inertial sensor data from the, the gestures and movements of the user can be continuously monitored and tracked during the user's interaction with the VR scenes. For example, while interacting with the scenes in the game, the user may make various gestures such as pointing and walking toward a particular content item in the scene. In one embodiment, the gestures can be tracked and processed by the system to generate a prediction of interaction with the particular content item in the game scene. In some embodiments, machine learning may be used to facilitate or assist in said prediction.

During HMD use, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment or metaverse rendered on the HMD. In some cases, the HMD can be wirelessly connected to a cloud computing and gaming system over a network. In one embodiment, the cloud computing and gaming system maintains and executes the video game being played by the user. In some embodiments, the cloud computing and gaming system is configured to receive inputs from the HMD and the interface objects over the network. The cloud computing and gaming system is configured to process the inputs to affect the game state of the executing video game. The output from the executing video game, such as video data, audio data, and haptic feedback data, is transmitted to the HMD and the interface objects. In other implementations, the HMD may communicate with the cloud computing and gaming system wirelessly through alternative mechanisms or channels such as a cellular network.

Additionally, though implementations in the present disclosure may be described with reference to a head-mounted display, it will be appreciated that in other implementations, non-head mounted displays may be substituted, including without limitation, portable device screens (e.g. tablet, smartphone, laptop, etc.) or any other type of display that can be configured to render video and/or provide for display of an interactive scene or virtual environment in accordance with the present implementations. It should be understood that the various embodiments defined herein may be combined or assembled into specific implementations using the various features disclosed herein. Thus, the examples provided are just some possible examples, without limitation to the various implementations that are possible by combining the various elements to define many more implementations.

In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation maybe produced by an emulator. In either case, if the video game is represented as a simulation, that simulation is capable of being executed to render interactive content that can be interactively streamed, executed, and/or controlled by user input.

It should be noted that in various embodiments, one or more features of some embodiments described herein are combined with one or more features of one or more of remaining embodiments described herein.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

The invention claimed is:

1. A method comprising:

accessing first game play data comprising a plurality of first video frames, wherein the first game play data is generated based on one or more first game states generated based on first input data received from a client device associated with a user, and wherein the first input data represents first inputs provided by the user to the client device during a progression of a video game from a starting point in a video game to a first progress point in the video game;

transferring the first game play data to the client device;

creating an artificial intelligence (AI) player using first training data generated by identifying, based in-part on the first input data, a first play style exhibited by the user from the starting point in the video game to the first progress point in the video game, wherein the AI player is configured to mimic the first play style exhibited by the user;

accessing second game play data comprising a plurality of second video frames, the plurality of second video frames occurring in a sequence of video frames after the plurality of first video frames, wherein the second game play data is generated based on one or more second game states generated based on second input data received from the client device, and wherein the second input data represents second inputs provided by the user to the client device during the progression of the video game from the first progress point in the video game to a second progress point in the video game that occurs after the first progress point;

transferring the second game play data to the client device;

training the AI player to result in a trained AI player using second training data generated by identifying, based in-part on the second input data, a second play style exhibited by the user from the first progress point to the second progress point in the video game, wherein the trained AI player is configured to mimic the second play style exhibited by the user;

using the trained AI player to generate third game play data comprising a plurality of third video frames, the plurality of third video frames occurring in the sequence of video frames after the plurality of second video frames, wherein the third game play data is generated based on one or more third game states generated based on third input data, and wherein the third input data represents third inputs generated by the trained AI player during the progression of the video game from the second progress point to a third progress point in the video game, wherein the third progress point occurs after the second progress point in the video game;

transferring the third game play data to the client device;

extrapolating a plurality of fourth video frames from two or more third video frames of the plurality of third video frames, the plurality of fourth video frames depicting a character that mimics the second play style exhibited by the user and played by the trained AI player; and generating a video recording of the trained AI player progressing in the video game based on the third game play data and the plurality of fourth video frames.

2. The method of claim 1, further comprising:

providing the video recording to the client device.

3. The method of claim 2, wherein providing the video recording comprises providing graphical user interface options to interact with the video recording and with the video game.

4. The method of claim 3, wherein the graphical user interface options includes a first option to view game play of the trained AI player, the first option providing a plurality of thumbnails generated from the video recording to allow the user to view a specific highlight reel of the game play of the trained AI player, a specific event of the game play of the trained AI player, and an entire game play of the trained AI player.

5. The method of claim 4, wherein the graphical user interface options includes a second option to take control of game play of the video game, and wherein providing the graphical user interface options comprises:

detecting selection of the second option, the second option allowing the user to identify a re-start point for restarting the game play of the video game, the re-start point identified using the video recording of the game play of the trained AI player; and presenting the video game for game play from the re-start point, wherein the re-start point of the video game is determined from game states of the video game included in game play data used to generate the video recording of the trained AI player.

6. The method of claim 1, wherein the trained AI player is further trained using inputs of a plurality of users who have played the video game, the plurality of users identified by matching attributes available in a profile of the trained AI player with attributes available in a corresponding user profile of each of the plurality of users, the inputs of the plurality of users retrieved from corresponding game play data maintained for the plurality of users.

7. The method of claim 1, wherein the trained AI player is further trained using inputs of a cluster of users who have played the video game, the cluster of users defined by matching attributes of the user with attributes of each user in the cluster of users, the inputs of the cluster of users retrieved from corresponding game play data maintained for each user of the cluster of users.

8. The method of claim 1, wherein access to the video game is provided to the trained AI player to allow the trained AI player to resume a game play of the user from a restart point defined during a prior game play session of the user, wherein the access allows the trained AI player to provide inputs mimicking the second play style of the user.

9. The method of claim 8, wherein the restart point is identified from a video recording generated for the game play of the user during the prior game play session.

10. The method of claim 1, wherein access is provided to the trained AI player to allow the trained AI player to represent the user and play the video game on behalf of the user during a subsequent game play session, the access allowing the trained AI player to play the video game from a starting point in the video game.

11. A server device comprising:

one or more processors; and a memory storing computer readable instructions which, when executed by the one or more processors, cause the server device to perform operations comprising:

accessing first game play data comprising a plurality of first video frames, wherein the first game play data is generated based on one or more first game states generated based on first input data received from a client device associated with a user, and wherein the first input data represents first inputs provided by the user to the client device during a progression of a video game from a starting point in a video game to a first progress point in the video game;

transferring the first game play data to the client device;

creating an artificial intelligence (AI) player using first training data generated by identifying, based in-part on the first input data, a first play style exhibited by the user from the starting point in the video game to the first progress point in the video game, wherein the AI player is configured to mimic the first play style exhibited by the user;

accessing second game play data comprising a plurality of second video frames, the plurality of second video frames occurring in a sequence of video frames after the plurality of first video frames, wherein the second game play data is generated based on one or more second game states generated based on second input data received from the client device, and wherein the second input data represents second inputs provided by the user to the client device during the progression of the video game from the first progress point in the video game to a second progress point in the video game that occurs after the first progress point;

transferring the second game play data to the client device;

training the AI player to result in a trained AI player using second training data generated by identifying, based in-part on the second input data, a second play style exhibited by the user from the first progress point to the second progress point in the video game, wherein the trained AI player is configured to mimic the second play style exhibited by the user;

using the trained AI player to generate third game play data comprising a plurality of third video frames, the plurality of third video frames occurring in the sequence of video frames after the plurality of second video frames, wherein the third game play data is generated based on one or more third game states generated based on third input data, and wherein the third input data represents third inputs generated by the trained AI player during the progression of the video game from the second progress point to a third progress point in the video game, wherein the third progress point occurs after the second progress point in the video game;

transferring the third game play data to the client device;

extrapolating a plurality of fourth video frames from two or more third video frames of the plurality of third video frames, the plurality of fourth video frames depicting a character that mimics the second play style exhibited by the user and played by the trained AI player; and generating a video recording of the trained AI player progressing in the video game based on the third game play data and the plurality of fourth video frames.

12. The server device of claim 11, the operations further comprising:

providing the video recording to the client device.

13. The server device of claim 12, wherein providing the video recording comprises providing graphical user interface options to interact with the video recording and with the video game.

14. The server device of claim 13, wherein the graphical user interface options includes a first option to view game play of the trained AI player, the first option providing a plurality of thumbnails generated from the video recording to allow the user to view a specific highlight reel of the game play of the trained AI player, a specific event of the game play of the trained AI player, and an entire game play of the trained AI player.

15. The server device of claim 14, wherein the graphical user interface options includes a second option to take control of game play of the video game, and wherein providing the graphical user interface options comprises:

detecting selection of the second option, the second option allowing the user to identify a re-start point for restarting the game play of the video game, the re-start point identified using the video recording of the game play of the trained AI player; and presenting the video game for game play from the re-start point, wherein the re-start point of the video game is determined from game states of the video game included in game play data used to generate the video recording of the trained AI player.

16. The server device of claim 11, wherein the trained AI player is further trained using inputs of a plurality of users who have played the video game, the plurality of users identified by matching attributes available in a profile of the trained AI player with attributes available in a corresponding user profile of each of the plurality of users, the inputs of the plurality of users retrieved from corresponding game play data maintained for the plurality of users.

17. The server device of claim 11, wherein the trained AI player is further trained using inputs of a cluster of users who have played the video game, the cluster of users defined by matching attributes of the user with attributes of each user in the cluster of users, the inputs of the cluster of users retrieved from corresponding game play data maintained for each user of the cluster of users.

18. The server device of claim 11, wherein access to the video game is provided to the trained AI player to allow the trained AI player to resume a game play of the user from a restart point defined during a prior game play session of the user, wherein the access allows the trained AI player to provide inputs mimicking the second play style of the user.

19. The server device of claim 18, wherein the restart point is identified from a video recording generated for the game play of the user during the prior game play session.

20. The server device of claim 11, wherein access is provided to the trained AI player to allow the trained AI player to represent the user and play the video game on behalf of the user during a subsequent game play session, the access allowing the trained AI player to play the video game from a starting point in the video game.

21. One or more non-transitory computer readable media storing computer readable instructions that, when executed by one or more processors, cause a system to perform operations comprising:

accessing first game play data comprising a plurality of first video frames, wherein the first game play data is generated based on one or more first game states generated based on first input data received from a client device associated with a user, and wherein the first input data represents first inputs provided by the user to the client device during a progression of a video game from a starting point in a video game to a first progress point in the video game;

transferring the first game play data to the client device;

creating an artificial intelligence (AI) player using first training data generated by identifying, based in-part on the first input data, a first play style exhibited by the user from the starting point in the video game to the first progress point in the video game, wherein the AI player is configured to mimic the first play style exhibited by the user;

accessing second game play data comprising a plurality of second video frames, the plurality of second video frames occurring in a sequence of video frames after the plurality of first video frames, wherein the second game play data is generated based on one or more second game states generated based on second input data received from the client device, and wherein the second input data represents second inputs provided by the user to the client device during the progression of the video game from the first progress point in the video game to a second progress point in the video game that occurs after the first progress point;

transferring the second game play data to the client device;

training the AI player to result in a trained AI player using second training data generated by identifying, based in-part on the second input data, a second play style exhibited by the user from the first progress point to the second progress point in the video game, wherein the trained AI player is configured to mimic the second play style exhibited by the user;

using the trained AI player to generate third game play data comprising a plurality of third video frames, the plurality of third video frames occurring in the sequence of video frames after the plurality of second video frames, wherein the third game play data is generated based on one or more third game states generated based on third input data, and wherein the third input data represents third inputs generated by the trained AI player during the progression of the video game from the second progress point to a third progress point in the video game, wherein the third progress point occurs after the second progress point in the video game;

transferring the third game play data to the client device;

extrapolating a plurality of fourth video frames from two or more third video frames of the plurality of third video frames, the plurality of fourth video frames depicting a character that mimics the second play style exhibited by the user and played by the trained AI player; and generating a video recording of the trained AI player progressing in the video game based on the third game play data and the plurality of fourth video frames.

* * * * *